United States Patent
Stevens et al.

(10) Patent No.: US 9,535,434 B2
(45) Date of Patent: Jan. 3, 2017

(54) MANAGING HOT WATER STORAGE AND DELIVERY

(71) Applicant: INTERNATIONAL BUSINESS MACHINES CORPORATION, Armonk, NY (US)

(72) Inventors: Mark B. Stevens, Austin, TX (US); John D. Wilson, Houston, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 835 days.

(21) Appl. No.: 13/834,931

(22) Filed: Mar. 15, 2013

(65) Prior Publication Data
US 2014/0277817 A1    Sep. 18, 2014

(51) Int. Cl.
G05D 23/00 (2006.01)
G05D 23/19 (2006.01)
F24H 9/20 (2006.01)

(52) U.S. Cl.
CPC ...... G05D 23/1917 (2013.01); G05D 23/1904 (2013.01); F24H 9/2007 (2013.01)

(58) Field of Classification Search
CPC ............ G05D 23/1917; G05D 23/1904; F24H 9/2007
USPC ........................................................ 700/300
See application file for complete search history.

(56) References Cited

U.S. PATENT DOCUMENTS

| | | | |
|---|---|---|---|
| 4,522,333 A | 6/1985 | Blau, Jr. et al. | |
| 2007/0051819 A1 | 3/2007 | Isaacson | |
| 2007/0175883 A1* | 8/2007 | Miu | F24H 9/2021 219/400 |
| 2009/0234513 A1 | 9/2009 | Wiggins | |
| 2010/0004790 A1 | 1/2010 | Harbin, III et al. | |
| 2010/0289643 A1* | 11/2010 | Trundle | F24F 11/0086 340/545.1 |
| 2011/0031323 A1* | 2/2011 | Nold | G05B 19/0428 236/20 R |
| 2011/0211612 A1 | 9/2011 | Branecky | |
| 2012/0060771 A1* | 3/2012 | Brian | F24D 19/1063 122/14.1 |

OTHER PUBLICATIONS

WO 2014/005868 A1; Ramachandran, Krishnamurthy; Alarm Clock Based Applications; Priority Data: Jul. 2, 2012.*

* cited by examiner

Primary Examiner — Robert Fennema
Assistant Examiner — Sivalingam Sivanesan
(74) Attorney, Agent, or Firm — Paul S. Drake

(57) ABSTRACT

A method, system or computer usable program product for managing a water heater utilized for heating stored hot water including utilizing an expected user schedule to determine an expected user load for storage in memory, utilizing ambient temperature data to determine a water heating load for storage in memory, utilizing a processor to analyze the expected user load and the water heating load stored in memory to determine a desired temperature for the stored hot water according to a predetermined policy, and utilizing the processor to instruct the water heater to heat the stored hot water to the desired temperature.

20 Claims, 6 Drawing Sheets

FIG. 5A

| Time Period | M | Tu | W | Th | F | Sa | Su |
|---|---|---|---|---|---|---|---|
| 07:00 - 07:05 | 5 | 10 | 10 | 10 | 10 | 0 | 0 |
| 07:05 - 07:10 | 10 | 25 | 25 | 25 | 25 | 0 | 0 |
| 07:10 - 07:15 | 25 | 20 | 20 | 20 | 20 | 0 | 0 |
| 07:15 - 07:20 | 20 | 15 | 15 | 15 | 15 | 5 | 0 |

FIG. 5B

| Ambient Temp C | Initial Load | Subsequent Load |
|---|---|---|
| 10° | 26 | 20 |
| 15° | 22 | 10 |
| 20° | 20 | 0 |
| 25° | 18 | -30 |

FIG. 5C

| Minimum: | 50 C | Cold |
|---|---|---|
| Maximum: | 65 C | Hot |
| Schedule: | 7am M - F | Hot |
|  | 9am Sa | Hot |
|  | Midnight M - Su | Cold |

MANAGING HOT WATER STORAGE AND DELIVERY

BACKGROUND

1. Technical Field

The present invention relates generally to managing hot water storage and delivery, and in particular, to a computer implemented method for predicting and managing water heating requirements.

2. Description of Related Art

Running hot water is generally considered a modern convenience. Although the Romans famously had their baths including a warm one called a tepidarium heated by an underfloor heating system, it wasn't until 1889 when Edwin Ruud invented the automatic storage water heater. Since that time, many types of water heaters have been designed and built including storage (tank-type) water heaters and on-demand (tankless) water heaters, which can be powered by natural gas, propane, heating oil, electricity, solar, and other energy sources.

Generally water heaters maintain and deliver hot water at a predesignated temperature. The hot water can then be mixed with cold water to provide water at the desired temperature to a point of delivery. The predesignated temperature can generally be adjusted by a user through a simple control such as a knob on the water heater.

SUMMARY

The illustrative embodiments provide a method, system, and computer usable program product for managing a water heater utilized for heating stored hot water including utilizing an expected user schedule to determine an expected user load for storage in memory, utilizing ambient temperature data to determine a water heating load for storage in memory, utilizing a processor to analyze the expected user load and the water heating load stored in memory to determine a desired temperature for the stored hot water according to a predetermined policy, and utilizing the processor to instruct the water heater to heat the stored hot water to the desired temperature.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIGS. 5A through 5C are diagrams of data structures in which various embodiments may be implemented.

DETAILED DESCRIPTION

Processes and devices may be implemented and utilized for predicting and managing water heating requirements. These processes and apparatuses may be implemented and utilized as will be explained with reference to the various embodiments below.

Figure 1:
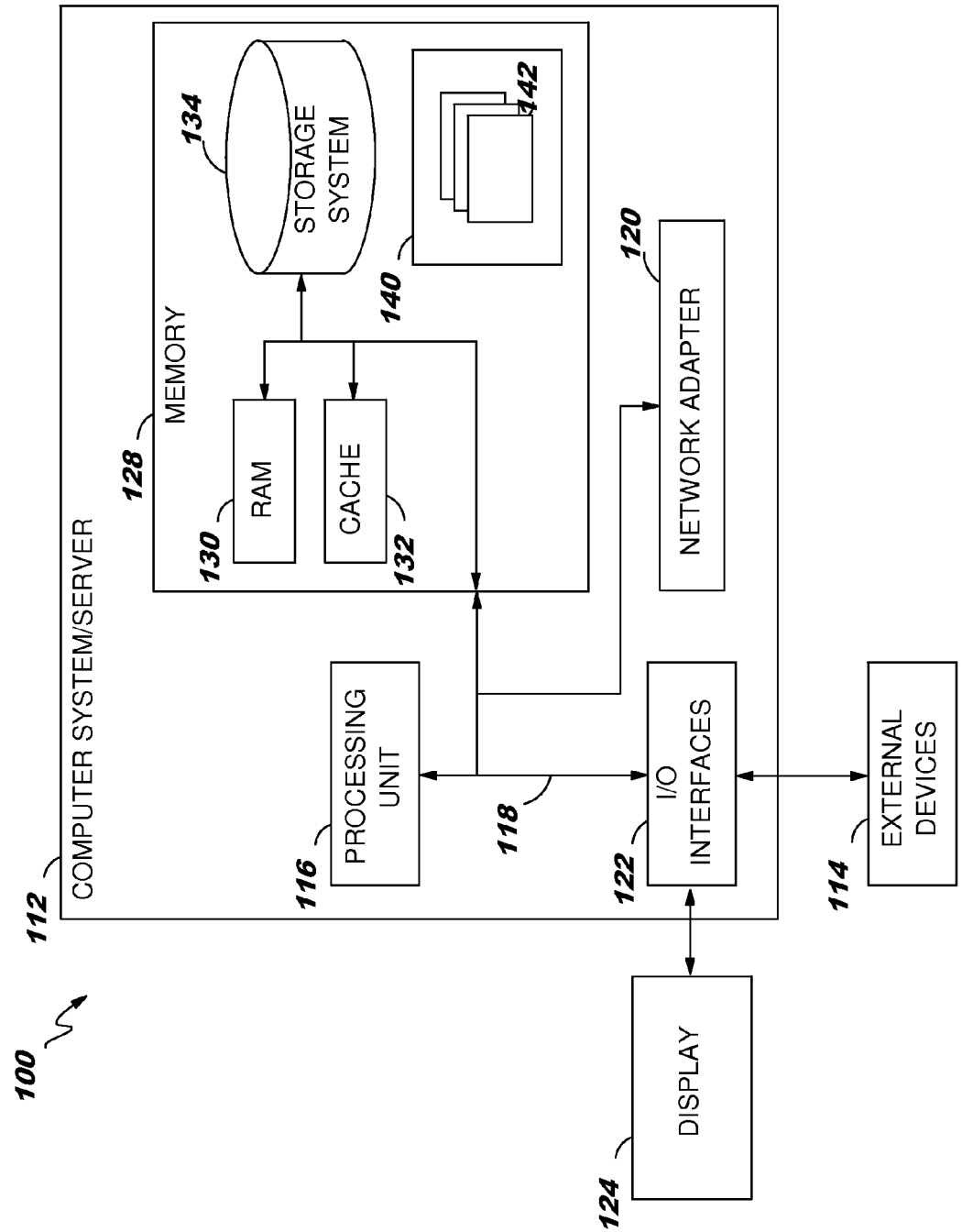
FIG. 1 is a block diagram of a data processing system in which various embodiments may be implemented.

FIG. 1 is a block diagram of a data processing system in which various embodiments may be implemented. Data processing system 100 is one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example, storage system 134 can be provided for reading from and writing to a non-removable, non-volatile magnetic media (not shown and typically called a "hard drive"). Although not shown, a USB interface for reading from and writing to a removable, non-volatile magnetic chip (e.g., a "flash drive"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for predicting and managing water heating requirements.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, tape drives, RAID systems, redundant processing units, data archival storage systems, external disk drive arrays, etc.

Figure 2:
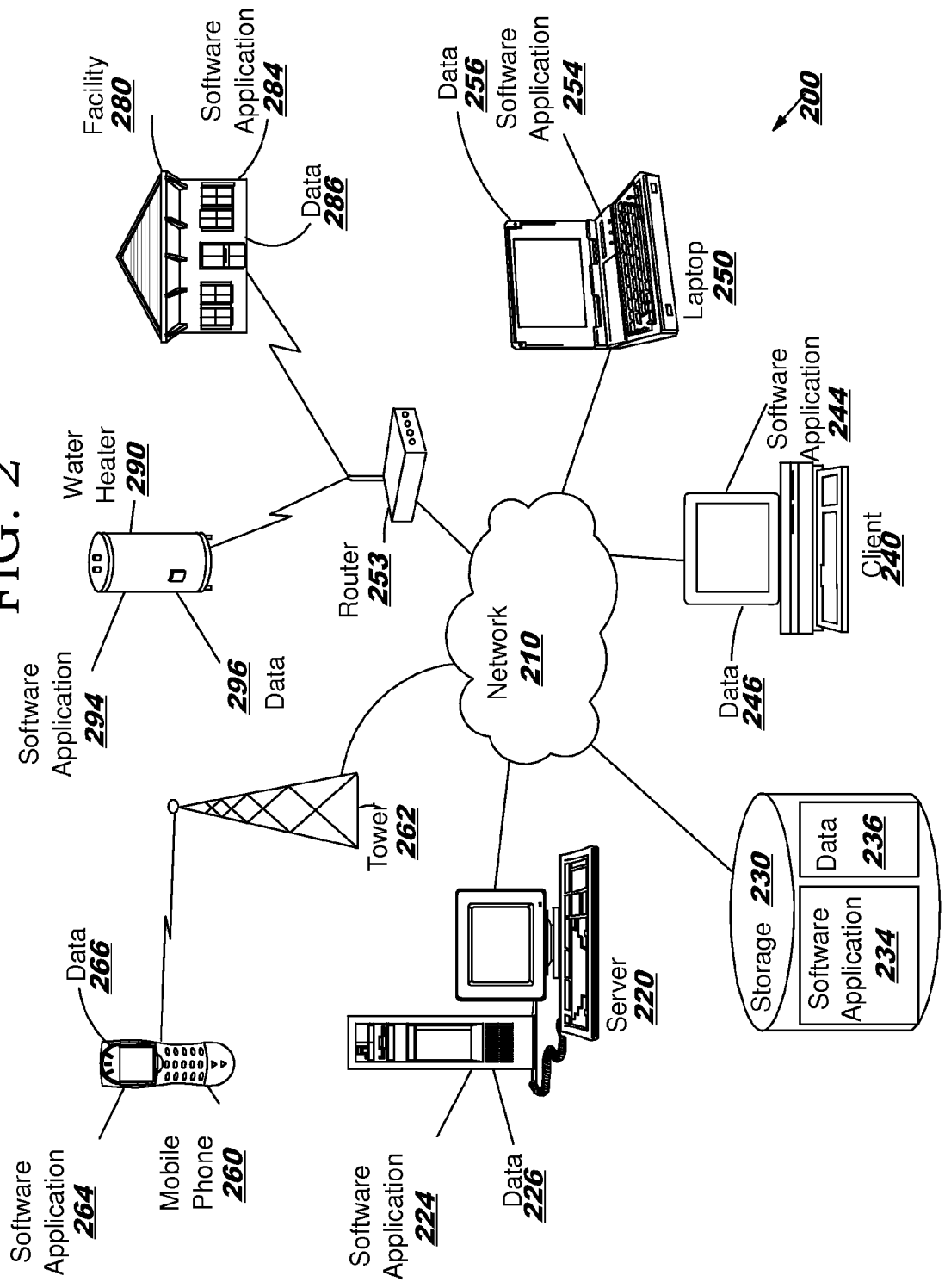
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250, facility 280 (such as a home or business), and water heater 290 are coupled to network 210 or each other, including wirelessly, such as through a network router 253. A mobile phone 260 may be coupled to network 210 through a mobile phone tower 262. Data processing systems, such as server 220, client 240, laptop 250, mobile phone 260, facility 280, and water heater 290 contain data and have software applications including software tools executing thereon. Other types of data processing systems such as personal digital assistants (PDAs), smartphones, tablets and netbooks may be coupled to network 210.

Server 220 may include software application 224 and data 226 for predicting and managing water heating requirements or other software applications and data in accordance with embodiments described herein. Storage 230 may contain software application 234 and a content source such as data 236 for predicting and managing water heating requirements. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Water heater 290 may include software applications 294 and data 296. Other types of data processing systems coupled to network 210 may also include software applications and data. Software applications could include a web browser, email, or other software application for predicting and managing water heating requirements.

Server 220, storage unit 230, client 240, laptop 250, mobile phone 260, facility 280, and water heater 290 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260, facility 280, and water heater 290 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 200 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 200 may also employ a service oriented architecture where interoperable software components distributed across a network may be packaged together as coherent business applications.

Figure 3:
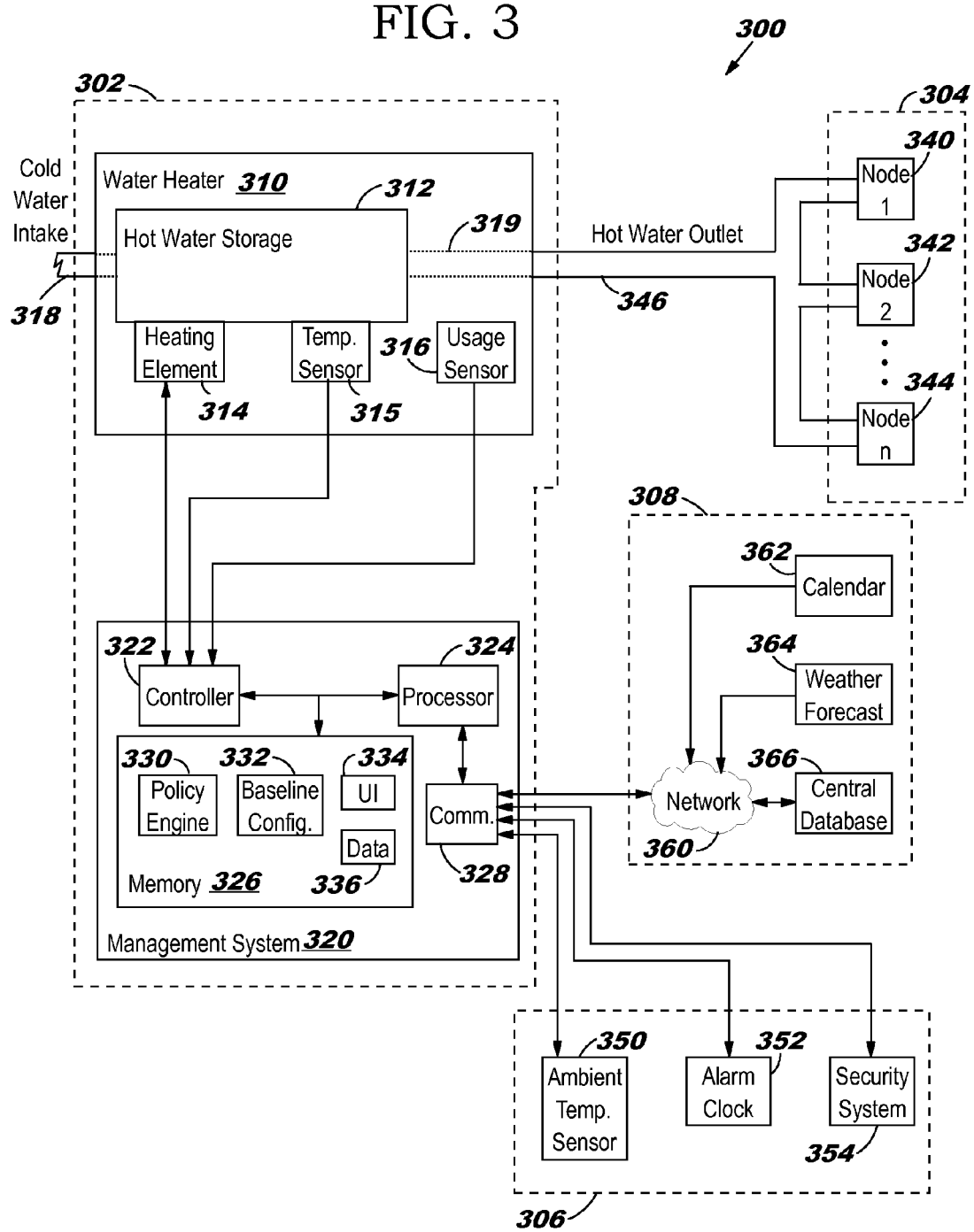
FIG. 3 is a block diagram of a hot water storage and delivery system in which various embodiments may be implemented.

FIG. 3 is a block diagram of a hot water storage and delivery system in which various embodiments may be implemented. A facility delivery system 300 includes a hot water storage and delivery system 302 that provides hot water to a set of nodes 304. In so doing, the hot water and delivery system may communicate with a set of facility internal devices 306 and a set of external devices 308.

The hot water storage and delivery system includes a water heater 310 and a management system 320. The water heater includes a hot water storage 312, a heating element 314, a temperature sensor 315 and a usage sensor 316. The hot water storage receives cold water from a cold water intake 318 which is heated by heating element 314 and then provides that hot water through a hot water outlet 319 to the set of nodes 304. The hot water storage may be an insulated tank internal to the water heater, a set of pipes where the hot water is circulated continuously by a pump, a hybrid system, or other devices to store hot water. Temperature sensor provides a signal indicating the temperature of the water in the hot water storage. Usage sensor 316 provides a signal indicating the amount of hot water being delivered by the water heater, which is used for helping determine demand.

The management system 320 may be internal or external to water heater 310. Management system 320 includes a controller 322 for controlling the operation of the water heater heating element 314, and for receiving data from heating element 314, temperature sensor 315 and usage sensor 316. The operations of controller 322 are managed by processor 324 under the control of software and data stored in memory 326. Processor may also communicate through a communications device 328 with facility internal devices 306 and external devices 308. Such communications may be wired, wireless, through a network, or across the internet.

Memory 326 includes software such as a policy engine 330 and a user interface (UI) 334 as well as data such as a baseline configuration 332 and general data 336 such as historical data. Policy engine 330 is utilized to manage the operation of the water heater according to a predetermined policy based on baseline configuration 332, user preferences, and inputs received. The inputs received include inputs from usage sensor 316, facility interior sensors 306, and external devices 308. The inputs received can also include cost information regarding the cost of power (e.g. electricity, natural gas) used to heat the water. User preferences may be provided through user interface 334 and stored in data 336. Baseline configuration 332 is a set of guidelines to utilize without any user preferences to override elements of the baseline configuration. Other types of software and data may be useful for managing the storage and delivery of hot water.

Nodes 304 can include various output fixtures or other devices for dispensing hot water. These output fixtures can include a sink faucet, a shower, a bathtub, a dishwasher, a clothes washer, etc. as represented by node 1 340, node 2 342, and node n 344. Nodes 340 receive hot water from the hot water storage and delivery system across hot water pipes 346 from hot water outlet 319. Each node may have a different water route, although some portions of the water routes may be in common. Heat may be lost through hot water pipes 346 due to various factors including the amount of pipe insulation, the length of the pipe to each node, the ambient temperature, etc. This loss of heat is referred to herein as the ambient temperature load or water heating load. That load may vary depending on the node dispensing the hot water. For example, one output fixture may have a much longer water route with a higher water heating load than another output fixture with a shorter water route.

Facility internal devices 306 can include a variety of devices such as an ambient temperature sensor 350, an alarm clock 352, and a security system 354. Ambient temperature sensor 350 can measure the temperature of the air surrounding the facility (external temperature), within the facility (internal temperature), in the area where the water heater is stored (storage area temperature), or a combination of these locations. The ambient temperature sensor is to allow a better prediction of the amount of heat needed to be generated by the heating element to meet a certain demand. The ambient temperature sensor may be located among the facility internal sensors as shown or it may be located near or with the water heater and may communicate directly with the controller. Alarm clock 352 is the device used by the user or users for waking up in the morning. Alarm clock 352 may be a radio alarm clock with capabilities of communicating an alarm clock setting with the communications device 328, or it may be a mobile phone or other device with such communication capabilities. Security system 354 is an alarm or other type of security system that can be set by a user into several modes such off when the user is at the facility, on in a stay mode when the user is at the facility, or on in an away mode when the user is away from the facility. In addition, the security system may have motion detectors that detect when someone is at and moving around the facility. These indicators may be utilized by the policy engine to determine potential hot water demand. Other types of facility internal devices may be utilized to provide information useful to the hot water storage and delivery system 302.

External devices 308 may be accessed across a network 360 and can include a calendar 362, a weather forecast 364 and a central database 366. Network 360 may be a local area network, a wide area network, or other type of network including the internet. Calendar 362 may be an on-line calendar of a user such as may be found in a cloud environment across the internet. This calendar information would allow the hot water and delivery system 302 to anticipate whether that user may be at the facility or elsewhere, or other information which may be useful for predicting hot water demand. Weather forecast 304 may also be across the internet and may be useful for predicting an ambient temperature and thereby predicting a water heating load. For example, if there is an expected sudden drop in ambient temperature about the same time the user is predicted to demand hot water such as for a shower, then the hot water may need to be heated to a higher temperature to meet that ambient temperature based water heating load and hot water demand. A central database 366 may include additional information useful for the hot water storage and delivery system 302. Such a central database may include a standard configuration for such a system when that system is first being set up. Central database 366 may also include statistical or historic data that may be useful in predicting the ambient temperature based water heating load or hot water demand. Other types of external devices may be utilized to provide information useful to the hot water storage and delivery system 302.

Figure 4:
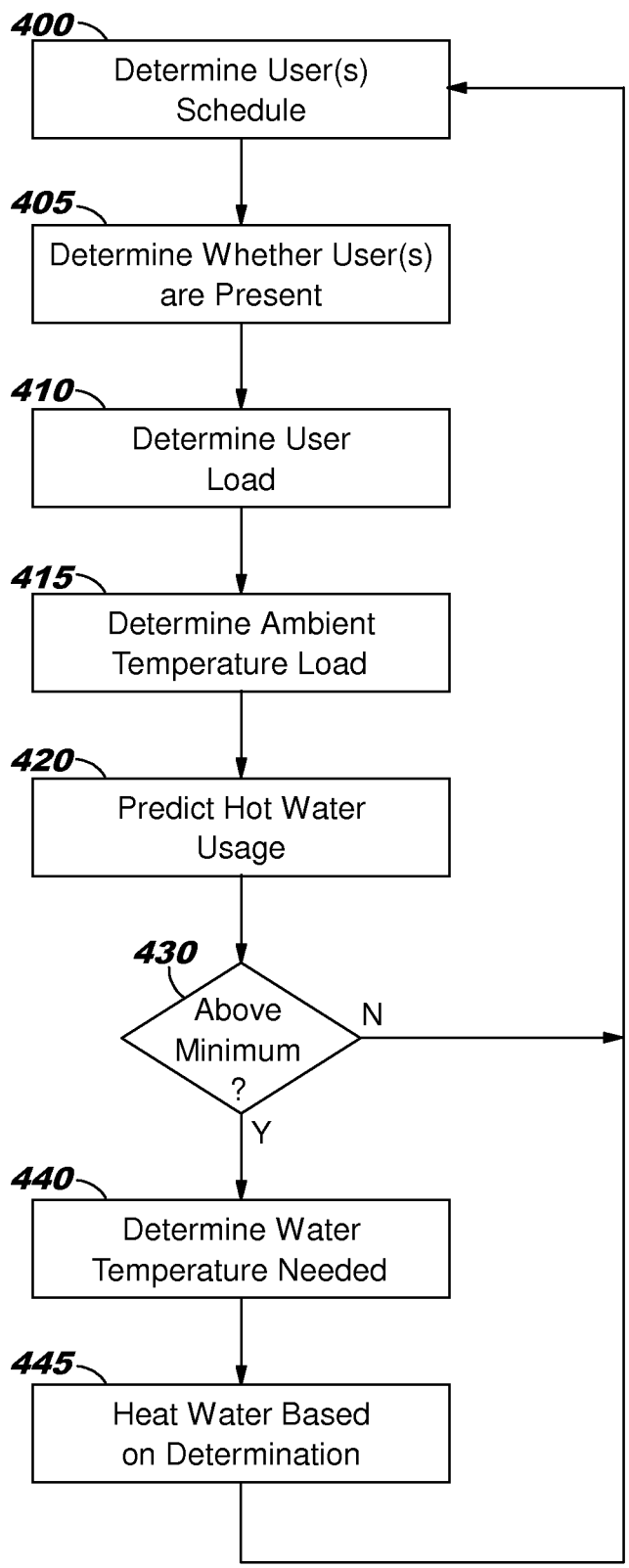
FIG. 4 is a flow diagram of managing the storage and delivery of hot water in accordance with a first embodiment.

FIG. 4 is a flow diagram of managing the storage and delivery of hot water in accordance with a first embodiment. In this embodiment, this process is managed by the policy engine executed by the processor for a set of users in a facility. In alternative embodiments, a centralized server may perform the calculations described below for implementation by the local processor.

In a first step 400, which may be executed every time interval (e.g. every 5 minutes) the system determines an expected user schedule including the schedule of the user(s) for the next time period (e.g. one hour). This determination is based on a variety of factors including the alarm clock(s), the calendar of the user(s), prior usage data in combination with the alarm clock or calendar data (e.g. the user typically takes a shower 30 minutes after the alarm clock goes off, plus or minus 10 minutes), and security system information. For example, the system may determine from prior data that one user during typically uses X gallons of hot water 30 minutes after the alarm clock goes off, plus or minus 10 minutes, and the second user uses Y gallons of hot water 1 hour after the alarm clock goes off, plus or minus 15 minutes. This may be true for Monday through Friday, but alternative data may apply on weekends. In addition, if the security alarm is set to away, then there may not be a person at the facility, especially if any of the user's calendars states that the user(s) are traveling (while the alarm clock is still set to go off at the same time regardless).

In a second step 405, the system determines whether the facility is occupied and, if so, which user(s) are present. This can involve accessing the user(s) calendars to see if they are traveling. In addition, if the security alarm is set to away, then there may not be a person at the facility. Furthermore, if no motion sensor has been activated for the past 12 hours, then perhaps no one is at the facility even if the alarm clock is set to go off at the regular time. Even if no one is detected as present, it may be possible that someone is present or a user may arrive from elsewhere shortly. A probability may be determined based on prior history.

In a third step 410, an expected user load is determined. That is, the amount of hot water expected to be demanded by the user(s) determined to be present, likely to arrive or the less than certain probability of such. The expected user load can be determined based on an expected user schedule including prior history, the user calendar information, and alarm clock setting. The expected user schedule is combined with prior usage history to predict the expected user load. In subsequent step 415, an ambient temperature based water heating load is determined. This can be determined from prior history as well as other factors. For example, hot water usage may increase based on the ambient temperature being lower, requiring more hot water to offset heat loss in the pipes. This may vary depending on which node the user demands the hot water from. For example, a user may use the same amount of hot water for a shower regardless of location, but the however located further from the water heater will have greater hot water loss, especially if the ambient temperature is lower.

Subsequently, in step 420, the system predicts hot water usage for the next time period (e.g. an hour) based on the user schedule, whether and which user(s) are present, the expected user load for the time period, and the ambient temperature based water heating load. Statistical analysis and heuristics may be utilized to make this prediction. The prediction can be a range of expected values with a desired level of likelihood (e.g. a 95% confidence interval). Then in step 430, this prediction is compared to the minimum hot water storage capacity of the water heater. This minimum is based on the lowest allowable temperature for the hot water storage. If the predicted amount is less than the minimum, then processing returns to step 400 for repeating this process at the next time interval. If the predicted hot water usage is greater than the minimum, then processing continues to step 440.

In step 440, the system determines a water temperature needed to meet the predicted hot water usage for the next time period in accordance with the predetermined policy. This can include any energy cost information and user selections through the user interface regarding cost versus comfort. Then in step 445, the water is heated to the determined water temperature so long as that temperature does not exceed a maximum. For example, the standard configuration or the user preferences may require that the hot water be kept below a certain temperature for safety reasons, particularly if children reside in the facility. Processing then returns to step 400 for repeating this process at the next time interval.

FIGS. 5A through 5C are diagrams of data structures in which various embodiments may be implemented. FIG. 5A is a tabular data structure which may be generated from historical usage data to generate an average usage of hot water by day and time without regard to other factors such as the presence or lack of users. This data may be utilized as a baseline which can be modified for any given time period based on other factors such as the time the alarm clock is set. Although only four time periods are shown, this data structure can include all 24 hours of each day for 7 days a week. The time periods shown are in 5 minute increments. Other period of time may be utilized. The time is shown is in local time, but may be in universal time, and may be adjusted for daylight savings time. The units provided for each time period for each day may be in units of water such as gallons or liters, but may also be in units of energy to heat the hot water utilized. For example, if the water is heated by natural gas, the units may be in British thermal units (BTU) or kilocalories (kcal). In the example provided, the user(s) seem to wait an extra 5 minutes on Monday mornings compared to Tuesday through Friday to demand hot water such as for a shower. Demand is much lower on Saturday and Sunday mornings.

FIG. 5B is a tabular data structure which may be generated based on historical data on the effect of the ambient temperature on user demand and usage. In this example, the temperature is shown in Celsius, but may also be in degrees Fahrenheit. Although only four sets of temperatures are shown, a much broader range may be shown and a more detailed or less detailed set of temperatures may be shown. In addition, the numbers shown may be extrapolated to determine the ambient temperature based water heating load when the ambient temperature is between two values shown (e.g. for 17 C, the values for 15 C and 20 C may be used to generate a weighted average). There are two sets of measurements for each temperature. The first measurement is the number of units needed before the hot water reaches the user. These units may be in volume such as gallons or liters, or in thermal units such as BTUs or kcal. Although an average is shown across all nodes in this example, this may vary by node where the hot water is demanded. As shown, with colder temperatures, extra units are needed due to the pipes needing to be warmed up by the hot water. Subsequent to the initial load, there is additional loss due to the ambient temperature. That load also increases as the temperature drops. In addition, this load may be adjusted to be equal to 0 when the ambient temperature is room temperature as shown in the present example. The units shown may be in thermal units per volume such as BTUs per gallon or Kcal per liter.

FIG. 5C is a tabular data structure which may be generated from a baseline configuration and may be adjusted within certain acceptable ranges by a user through a user interface (UI) to affect the predetermined policy. In this example, the minim temperature is set to 50 C and the maximum to 65 C. Cooler temperatures may not be allowed due to health issues such as bacterial or amoebic growth. Higher temperatures may not be allowed due to the danger of scalding. Three different scheduled events are shown. The water heater may automatically be warmed to the hot temperature of 65 C at 7 am Monday through Friday and 9 am on Saturday. The water heater may also automatically be allowed to cool to the cold temperature of 50 C every day at midnight. These preferences may override demand predictions and may be modified by the user. Additional information can be stored in memory including cost information regarding the fuel source utilized to heat the water and user preferences regarding cost versus comfort.

Figure 6:
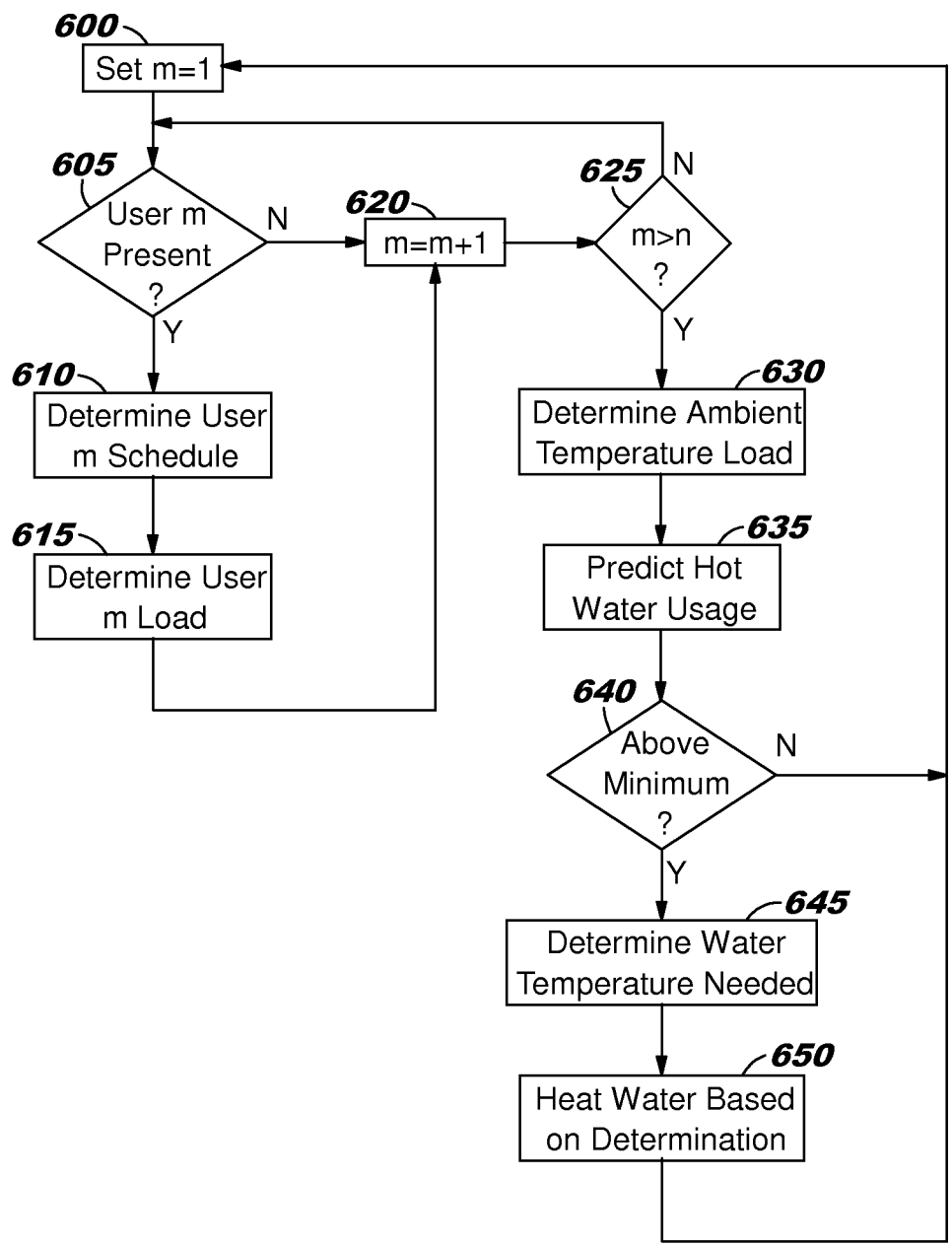
FIG. 6 is a flow diagram of managing the storage and delivery of hot water in accordance with a second embodiment.

FIG. 6 is a flow diagram of managing the storage and delivery of hot water in accordance with a second embodiment. In this embodiment, this process is managed by the policy engine executed by the processor for individual users in a facility. In alternative embodiments, a centralized server may perform the calculations described below for implementation by the local processor. In this example, each individual present in the facility may be identified and their individual hot water demands predicted which is then accumulated with the hot water demands predicted by the other individuals present. An individual may be identified by the use of a security code they enter into the security system when that user enters or leaves the facility. The individual may also be identified through a smartphone application which provides a GPS location of the user periodically to the security system or the hot water storage and delivery system directly. Other methods may be utilized to identify the users present including voice or face recognition.

In a first step 600, which may be executed every time interval (e.g. every 5 minutes) the system sets m=1 where m is the user identifier and 1 is the first user. In a second step 605, the system determines whether user m is present. In addition to the examples provided above, this can involve accessing the user(s) calendars to see if he or she is traveling. In addition, if the security alarm is set to away, then there may not be a person at the facility at all. Furthermore, if no motion sensor has been activated for the past 12 hours, then perhaps no one is at the facility even if the alarm clock is set to go off at the regular time. Even if no one is detected as present, it may be possible that user m is present or may arrive from elsewhere shortly. A probability may be determined based on prior history. If user M is present, then processing continues to step 610, otherwise processing continues to step 620.

In step 610, the system determines an expected user schedule including the schedule of user m for the next time period (e.g. one hour). This determination is based on a variety of factors including the alarm clock for user m, the calendar of user m, prior usage data in combination with the alarm clock or calendar data (e.g. user m typically takes a shower 30 minutes after the alarm clock goes off, plus or minus 10 minutes), and security system information. For example, the system may determine from prior data that user m typically uses X gallons of hot water 20 minutes after the alarm clock goes off, plus or minus 5 minutes. This may be true for Monday through Friday, but alternative data may apply on weekends. Subsequently in step 615, a user m load is determined. That is, the amount of hot water expected to be demanded by user m determined to be present (expected user load), likely to arrive or the less than certain probability of such. The expected user m load can be determined based on an expected user m schedule including prior history, the user calendar information, and alarm clock setting. The expected user m schedule is combined with prior usage history to predict the expected user m load. Various statistical measures and heuristics may be utilized to determine the user m load. That load is stored in memory for usage as described below.

Processing then returns to step 620 where m is incremented by 1 to identify the next user. Then in step 625 it is determined whether M is incremented higher than the number of users. If not, then processing returns to step 605, otherwise processing continues to step 630.

In subsequent step 630, an ambient temperature based water heating load is determined. This can be determined from prior history as well as other factors. For example, hot water usage may increase based on the ambient temperature being lower, requiring more hot water to offset heat loss in the pipes. This may vary depending on which node the users demand the hot water from. For example, a user may use the same amount of hot water for a shower regardless of location, but the however located further from the water heater will have greater hot water loss, especially if the ambient temperature is lower.

Subsequently, in step 635, the system predicts hot water usage for the next time period (e.g. an hour) based on whether and which users are present, the loads expected for each user, the typical user load for the time period, and the ambient temperature based water heating load. Statistical analysis and heuristics may be utilized to make this prediction. The prediction can be a range of expected values with a desired level of likelihood (e.g. a 95% confidence interval). Then in step 640, this prediction is compared to the minimum hot water storage capacity of the water heater. This minimum is based on the lowest allowable temperature for the hot water storage. If the predicted amount is less than the minimum, then processing returns to step 600 for repeating this process at the next time interval. If the predicted hot water usage is greater than the minimum, then processing continues to step 645.

In step 645, the system determines a water temperature needed to meet the predicted hot water usage for the next time period in accordance with the predetermined policy. This can include any energy cost information and user selections through the user interface regarding cost versus comfort. Then in step 650, the water is heated to the determined water temperature so long as that temperature does not exceed a maximum. For example, the standard configuration or the user preferences may require that the hot water be kept below a certain temperature for safety reasons, particularly if children reside in the facility. Processing then returns to step 600 for repeating this process at the next time interval.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for predicting and managing water heating requirements. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method of managing a water heater utilized for heating stored hot water comprising:
utilizing an expected user schedule to determine an expected user load for hot water delivered to a set of output fixtures for use by a set of users;

utilizing ambient temperature data to determine a water heating load for water storage and water delivery to the set of users in response to the expected user load for storage in memory;

utilizing a processor to analyze the expected user load and the water heating load stored in memory to determine a desired temperature for the stored hot water according to a predetermined policy; and utilizing the processor to instruct the water heater to heat the stored hot water to the desired temperature;

wherein determining the water heating load for water delivery includes considering accumulated expected usage from more than one water route based on ambient temperature data and water route length with more than one of the set of output fixtures providing the expected user load.

2. The method of claim 1 further comprising determining which user is present; and wherein the expected user schedule utilized to determine the expected user load is utilized to determine an individual expected user load for each identified user.

3. The method of claim 2 wherein the expected user load includes an accumulated individual expected user load for a period of time by more than one user.

4. The method of claim 1 wherein determining the expected user schedule includes determining prior usage data by time period.

5. The method of claim 1 wherein the predetermined policy is based on a baseline configuration stored in memory and a set of user preferences received through a user interface.

6. The method of claim 5 wherein the predetermined policy includes criteria selected from a group consisting of comfort and energy cost reduction.

7. The method of claim 6 wherein the expected user schedule comprises data selected from a group consisting of calendar information, alarm clock setting, security system information, and prior usage information stored in memory; wherein the expected user load includes an accumulated expected usage for a period of time by more than one user; and wherein determining the water heating load includes considering accumulated expected usage from more than one water route with more than one output fixture.

8. A computer usable program product comprising a computer usable storage medium including computer usable code for use in managing a water heater utilized for heating stored hot water, the computer usable program product comprising code for performing the steps of:

utilizing an expected user schedule to determine an expected user load for hot water delivered to a set of output fixtures for use by a set of users;

utilizing ambient temperature data to determine a water heating load for water storage and water delivery to the set of users in response to the expected user load for storage in memory;

utilizing a processor to analyze the expected user load and the water heating load stored in memory to determine a desired temperature for the stored hot water according to a predetermined policy; and utilizing the processor to instruct the water heater to heat the stored hot water to the desired temperature;

wherein determining the water heating load for water delivery includes considering accumulated expected usage from more than one water route based on ambient temperature data and water route length with more than one of the set of output fixtures providing the expected user load.

9. The computer usable program product of claim 8 further comprising determining which user is present; and wherein the expected user schedule utilized to determine the expected user load is utilized to determine an individual expected user load for each identified user.

10. The computer usable program product of claim 9 wherein the expected user load includes an accumulated individual expected user load for a period of time by more than one user.

11. The computer usable program product of claim 8 wherein determining the expected user schedule includes determining prior usage data by time period.

12. The computer usable program product of claim 8 wherein the predetermined policy is based on a baseline configuration stored in memory and a set of user preferences received through a user interface.

13. The computer usable program product of claim 12 wherein the predetermined policy includes criteria selected from a group consisting of comfort and energy cost reduction.

14. A data processing system for managing a water heater utilized for heating stored hot water, the data processing system comprising:

a processor; and a memory storing program instructions which when executed by the processor execute the steps of:

utilizing an expected user schedule to determine an expected user load for hot water delivered to a set of output fixtures for use by a set of users;

utilizing ambient temperature data to determine a water heating load for water storage and water delivery to the set of users in response to the expected user load for storage in memory;

utilizing a processor to analyze the expected user load and the water heating load stored in memory to determine a desired temperature for the stored hot water according to a predetermined policy; and utilizing the processor to instruct the water heater to heat the stored hot water to the desired temperature;

wherein determining the water heating load for water delivery includes considering accumulated expected usage from more than one water route based on ambient temperature data and water route length with more than one of the set of output fixtures providing the expected user load.

15. The data processing system of claim 14 further comprising determining which user is present; and wherein the expected user schedule utilized to determine the expected user load is utilized to determine an individual expected user load for each identified user.

16. The data processing system of claim 15 wherein the expected user load includes an accumulated individual expected user load for a period of time by more than one user.

17. The data processing system of claim 14 wherein determining the expected user schedule includes determining prior usage data by time period.

18. The data processing system of claim 14 wherein the predetermined policy is based on a baseline configuration stored in memory and a set of user preferences received through a user interface.

19. The data processing system of claim 18 wherein the predetermined policy includes criteria selected from a group consisting of comfort and energy cost reduction.

20. The data processing system of claim 19 wherein the expected user schedule comprises data selected from a group consisting of calendar information, alarm clock setting, security system information, and prior usage information stored in memory; wherein the expected user load includes an accumulated expected usage for a period of time by more than one user; and wherein determining the water heating load includes considering accumulated expected usage from more than one water route with more than one output fixture.

* * * * *